May 27, 1969

W. D. ALLISON 3,446,514

INTERCONNECTED VEHICLE SUSPENSION

Filed March 1, 1967

WILLIAM D. ALLISON
INVENTOR

BY John R. Faulkner
Clifford L. Sadler

ATTORNEYS

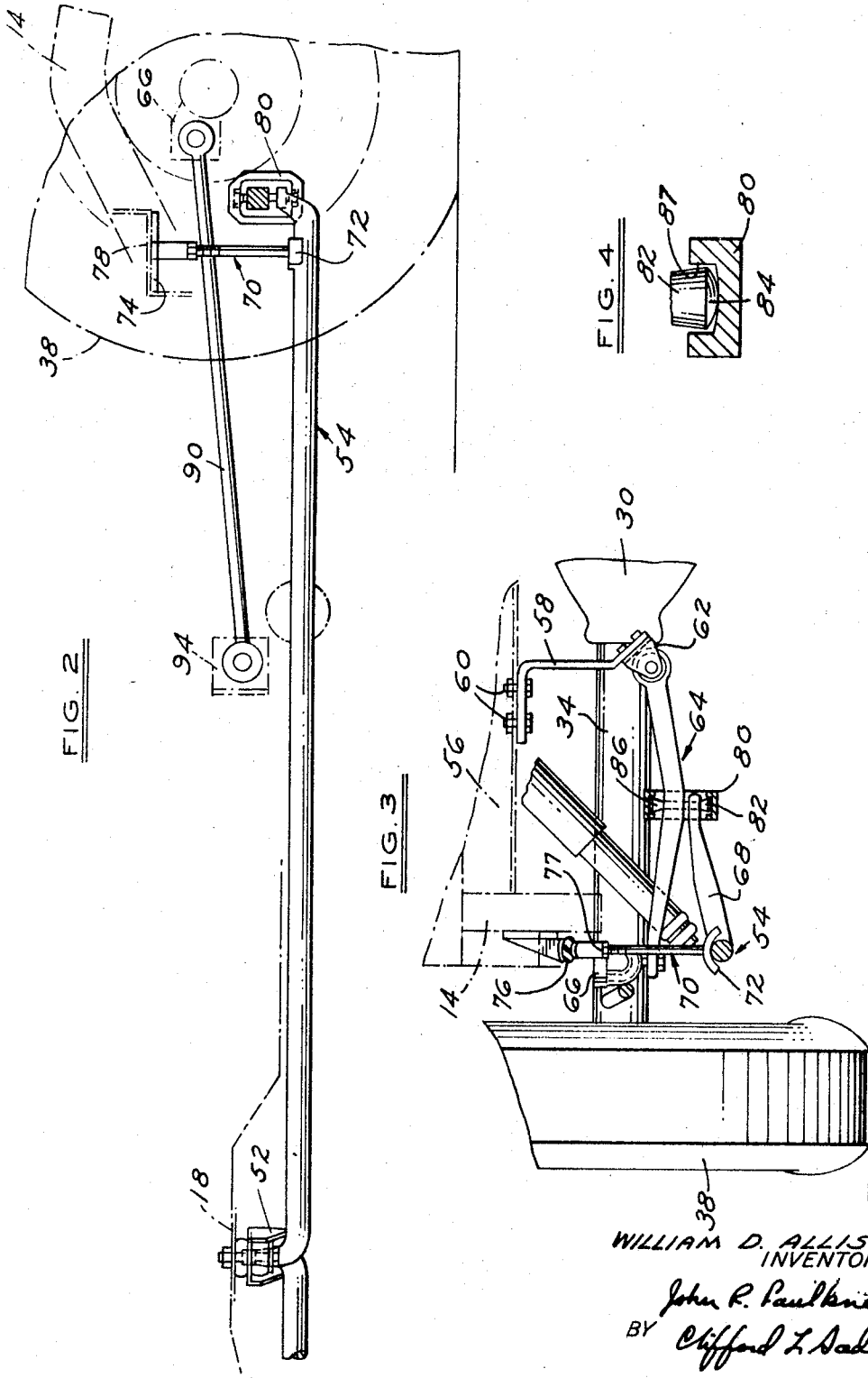

United States Patent Office 3,446,514
Patented May 27, 1969

3,446,514
INTERCONNECTED VEHICLE SUSPENSION
William D. Allison, Grosse Pointe Farms, Mich., assignor to Ford Motor Company, Dearborn, Mich., a corporation of Delaware
Filed Mar. 1, 1967, Ser. No. 619,735
Int. Cl. B60g *11/18*
U.S. Cl. 280—124          9 Claims

ABSTRACT OF THE DISCLOSURE

A vehicle suspension system in which each of the wheels supports the end of a longitudinally extending torsion bar and the torsion bars for the front and rear are interconnected on the left and right sides. With this construction, forces produced by jounce and rebound wheel movement at one wheel will be transferred, at least in part, to the other wheel on the same side of the vehicle.

BACKGROUND OF THE INVENTION

The present invention is an improvement of the limited interconnected suspension system described in my copending application entitled "Vehicle Variable Interconnected Suspension System," Ser. No. 544,756, filed Apr. 25, 1966, now Patent 3,386,751 issued June 4, 1968. More particularly, the present invention presents an improvement in the rear suspension construction for a vehicle having a limited interconnected suspension system of the type described in that application.

BRIEF SUMMARY OF THE INVENTION

In accordance with the preferred embodiment of the invention, a vehicle has a rigid axle housing extending from wheel to wheel. A transverse load arm is pivotally connected to the lower end of a spring steel hanger attached to and depending from a body cross member. The outer end of the load arm is attached by a pivotal connection to the axle housing. A tension link surrounds the load arm at a point intermediate its ends and connects the arm to the end of a torsion spring. Spaced outwardly from the tension link is a compression strut that is interposed between the torsion bar and the frame or body. The length of the strut is made adjustable for attainment of the desired riding height.

A vehicle having a suspension according to this invention will exhibit superior ride and handling characteristics. The suspension is noted for its simplicity and ease of manufacture. In addition, the riding height adjustment may be made readily.

BRIEF DESCRIPTION OF THE DRAWINGS

FIGURE 2 is a side elevational view of a portion of the suspension system of FIGURE 1;

FIGURE 3 is a sectional view taken along section lines 3—3 of FIGURE 1; and

FIGURE 4 is an enlarged view showing the bearing engaging one of the links shown in FIGURE 3.

DETAILED DESCRIPTION OF THE INVENTION

Figure 1:
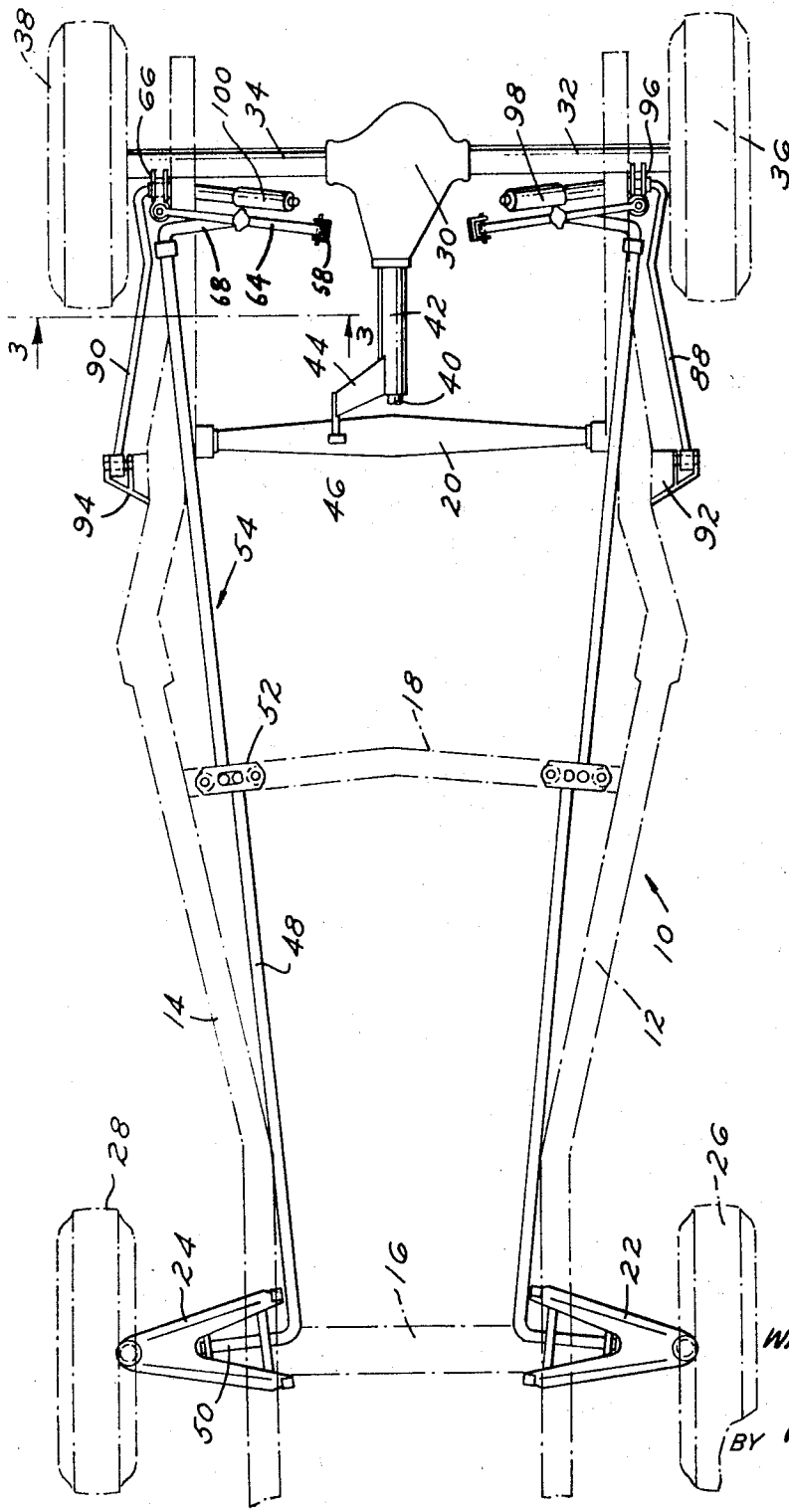
FIGURE 1 is a top plan view of a motor vehicle having a limited interconnected suspension system constructed in accordance with the present invention.

Referring now to the drawings for a more detailed description of the present invention, attention is directed to FIGURE 1 which discloses a top plan view of a vehicle having a limited interconnected suspension system of the general type described in my Patent 3,386,751 referred to above. In the construction of FIGURE 1, the vehicle has a chassis frame structure 10 that includes left and right side rails 12 and 14. These side rails are connected by frame cross members 16, 18 and 20. At the front of the vehicle, the frame 10 is supported by a conventional independent suspension system which includes upper and lower suspension arms that are pivotally connected to the side rails 12 and 14 or other chassis components. The upper suspension arms are designated by reference numerals 22 and 24. Road wheels 26 and 28 are situated at the outer ends of the suspension arms and are connected thereto by wheel spindles not shown.

At the rear of the vehicle, a differential housing 30 has left and right axle housing portions 32 and 34 rigidly secured thereto. Rear driving wheels 36 and 38 are rotatably mounted at the outer ends of the axle housing 32, 34. A drive shaft 40 is drivingly connected to the gearing within the differential housing 30 and is surrounded by a torque tube 42. The torque tube 42 is rigidly secured to the differential 30 and extends forwardly therefrom. A bracket 44 has one end welded to the tube 42 and its other end linked by a shackle 46 to the frame cross member 20. The tube 42, bracket 44 and link 46 constitute a torque reaction mechanism that is adapted to support the differential against rotation during acceleration.

The spring suspensions for the left and right sides of the vehicle are identical and, therefore, in the interest of brevity the structure for the right side will be described only.

The vehicle chassis 10 is supported on the road wheels at the front of the vehicle by means of a torsion bar 48 which has its front end bent at an angle to form a lever arm portion 50. Lever portion 50 is connected to the suspension arm 24. The rear end of the torsion bar 48 is connected to a bracket 52 which, in turn, is resiliently mounted on the frame cross member 18.

A rear torsion bar 54 has its forward end also connected to the bracket 52. The connection between the rear end of torsion bar 48 and front end of torsion bar 54, the construction of the bracket 52 and the mounting of this structure on the frame cross member 18 may be of the type illustrated and described in my previously mentioned Patent 3,386,751.

Referring to FIGURE 3, a frame cross member 56 supports a resilient hanger 58. The hanger 58 is formed of spring steel and has one end rigidly secured to the cross member 56 by means of bolts 60. A bracket 62 secured to the lower end of the hanger 58 pivotally supports the inner end of a load arm 64. The outer end of the arm 64 is pivotally connected to a bracket 66 that is rigidly welded to the outer end of the axle housing portion 34.

The rear end of the torsion bar 54 is bent at an angle to form an integral lever portion 68. A compression strut 70 has a lower end with an arcuate portion 72 that engages the spring 54. The portion 72 of the strut supports the torsion bar 54 near the end of its torsional spring portion adjacent to the lever arm 68. The upper end of the strut 70 has a significant longitudinal span as indicated at 74 in FIGURE 2. A rubber member 76 is interposed between the upper end 74 of the structure and the frame bracket 78. Bracket 78 is welded to cross frame member 56. The longitudinal span of the portion 74 of the compression strut 70 stabilizes the fore and aft location of the lower end 72 of the strut which is in rolling contact with the torsion spring 54.

A threaded mechanism 77 is interposed in the compression link 70 to permit the length of the link to be adjusted. This adjustment allows the distance between the vehicle body and the axle to be altered in order to maintain a level attitude to the body. In other words, the mechanism 77 permits adjustment of the desired riding height.

An annular link 80 surrounds the load arm 64 and the end of the lever portion 68 of the torsion spring 54. The link 80 is loaded in tension. A button 82 is welded to the end of the lever portion 68 of the spring 54 and has a spherical end surface 84 that engages a recessed portion in the link 80. This construction is best seen in FIGURE 4. A similar button 86 is connected to the transverse arm 64 and has a spherical surface that engages the link 80 at its upper end.

The rolling contacts illustrated in FIGURE 4 are employed in the tension link 80 connecting the load arm 64 and the end of the torsion bar lever 68 to reduce friction. The bearing surfaces built on the inner surface of the link 80 are substantially flat and parallel to each other and are recessed within shallow cups 87 to insure proper location. The bearings 86 and 82 on the load arm and lever present spherical surfaces for single point rolling contact engagement with the flat surfaces of the link 80. The bearing surfaces are hardened for durability and do not require lubrication.

Suspension links 88 and 90 of the trailing arm type have their forward ends connected to frame brackets 92 and 94. The rear ends of the links 88 and 90 are pivotally connected to axle housing brackets 96 and 66. The links 88 and 90 are set at an angle so as to diverge forwardly and outwardly. With this geometry, when the vehicle chassis moves laterally in response to a centrifugal or other lateral force, as permitted by the spring metal hanger 58, the angling of the suspension links 88 and 90 will provide understeer characteristics. Understeer improves handling while cornering.

Telescopic hydraulic shock absorbers have their lower ends pivotally connected to axle housing brackets and their upper ends connected to chassis components. The shock absorbers are designated by reference numerals 98 and 100.

The vehicle body is resiliently supported on the axle housing 34 by the compression link 70 connected to the torsion bar 54 and by the tension link 80 connecting the torsion bar 54 to the axle by means of the arm 64. Jounce and rebound movement of the wheel 38 with respect to the chassis 14 imparts a twist to the torsion bar 54 which is transmitted, in part, through the connecting link 52 to the front torsion bar 48. This limited interconnection between the front and rear wheels stabilizes the vehicle and reduces fore and aft pitching. The pitching phenomenon is usually associated with vehicles having a short wheel base and this suspension is particularly effective in improving the ride of such vehicles.

In my Patent 3,386,751, a means was employed at the front suspension for reversing the direction of rotation of the front torsion bar so as to obtain the interconnected feature. In that suspension, the torsion bar had an outwardly bent end that was linked to the upper suspension arm. The link was connected to the upper arm at a point spaced inwardly of the frame pivot support for the upper arm. This construction reversed the direction of rotation of the torsion bar, that is, when the suspension arm moved in a clockwise direction the lever end of the torsion bar moved counterclockwise.

In the present invention, the front torsion bar has the lever arm end 50 extending outwardly and is directly connected to the suspension arm 42 so that the two move conjointly. Thus, when the right wheel 28 moves upwardly in jounce, the torsion bar 48 will be twisted in a clockwise direction when viewed from the front of the vehicle. This clockwise twist will be imparted to the rear torsion bar 54 through the intermediate connection 52. Referring to FIGURE 3, the clockwise twisting of the torsion bar 54 will increase the tension loading of link 80 and this, in turn, will tend to pull the chassis 14 downwardly by increasing the loading on the hanger 58. This reaction tends to maintain the vehicle body in a level attitude and prevent pitching.

The foregoing description constitutes the presently preferred embodiment of this invention. Modifications and alterations may occur to those skilled in the art which will come within the scope and spirit of the following claims.

I claim:
1. A suspension system for a motor vehicle having a vehicle chassis, a pair of rear wheels, rigid axle housing means extending between said wheels and rotatably supporting said wheels, a pair of suspension links having their forward ends pivotally connected to said chassis and their rearward ends pivotally connected to said axle housing means, laterally extending load arms having their inner ends pivotally connected to said chassis and their outer ends pivotally connected to said axle housing, a pair of rear torsion bars each having a portion connected to said chassis, the rear end of each of said rear torsion bars having a lever end extending laterally inwardly and connected to said load arms, a compression device interposed between said chassis and one of said torsion bars, a tension link connecting the lever end of one of said rear torsion bars and one of said load arms.

2. A suspension system according to claim 1 and including:
said compression strut having its upper end connected to said chassis and its lower end connected to said one torsion bar, said tension link connecting the lever end of said one rear torsion bar and said one load arm, said compression strut having means for varying its length to adjust the riding height of said vehicle.

3. A suspension system according to claim 1 and including:
said compression strut having an anti-friction rolling connection with said one torsion bar, said tension link having anti-friction rolling connections with said one load arm and said one torsion bar lever arm.

4. A suspension system for a motor vehicle having a vehicle chassis, a pair of rear wheels, rigid axle housing means extending between said wheels and rotatably supporting said wheels, a pair of suspension links having their forward ends pivotally connected to said chassis and their rearward ends pivotally connected to said axle housing means, laterally extending load arms having their inner ends pivotally connected to said chassis and their outer ends pivotally connected to said axle housing, a pair of rear torsion bars each having a portion connected to said chassis, the rear end of each of said rear torsion bars having a lever end extending laterally inwardly and connected to said load arms, front suspension arm means connecting a pair of front wheels to said chassis for jounce and rebound movement, a pair of front torsion bars having their front ends connected to said front suspension arm means, a pair of mounting means connected to the rear ends of said front torsion bars and the front ends of said rear torsion bars, said mounting means being connected to said chassis.

5. A suspension system according to claim 4 and including:
said front torsion bars each having an angled end portion extending outwardly and secured to said front suspension arm means.

6. A suspension system according to claim 5 and including:
a compression strut having its upper end connected to said chassis and its lower end connected to one of said rear torsion bars, a tension link connecting the lever end of one of said rear torsion bars and one of said load arms.

7. A suspension system according to claim 4 and including:
a compression device having its upper end connected to said chassis and its lower end connected to one of said rear torsion bars, a tension link connecting the lever end of one of said rear torsion bars and one of said load arms.

8. A suspension system according to claim 5 and including:

a compression device interposed between said chassis and one of said rear torsion bars, a tension link connecting the lever end of one of said rear torsion bars and one of said load arms.

9. A suspension system for a motor vehicle having a pair of front wheels, front suspension arm means, a vehicle chassis, said front suspension arm means connecting said wheels to said chassis for jounce and rebound movement, a pair of front torsion bars having their front ends connected to said front suspension arm means, said front torsion bars each having an angled end portion extending outwardly and secured to one of said front suspension arm means, a pair of rear wheels, a rigid axle housing means extending between said wheels and rotatably supporting said wheels, a pair of suspension links having their forward ends pivotally connected to said chassis and their rearward ends pivotally connected to said axle housing means, said suspension links being angled forwardly and outwardly, depending resilient hanger means having their upper ends secured to said chassis, laterally extending load arms having their inner ends pivotally connected to said hanger means and their outer ends pivotally connected to said axle housing, a pair of rear torsion bars, a pair of mounting means connected to the rear ends of said front torsion bars and the front ends of said rear torsion bars, said mounting means being connected to said chassis, the rear ends of said rear torsion bars each having a lever end extending inwardly, a compression strut having its upper end connected to said chassis and its lower end connected to one of said rear torsion bars, a tension link connecting the lever end of one of said rear torsion bars and one of said load arm, said compression strut having means for varying its length to adjust the riding height of said vehicle, said compression strut having an anti-friction rolling connection with said torsion bar, said tension link having anti-friction rolling connections with said load arm and said torsion bar lever arm.

References Cited

UNITED STATES PATENTS

| | | | |
|---|---|---|---|
| 3,259,201 | 7/1966 | Allison | 280—124.3 X |
| 2,906,543 | 9/1959 | Polhemus | 280—124.3 X |

PHILIP GOODMAN, *Primary Examiner.*

U.S. Cl. X.R.

267—57